March 25, 1941.    F. M. CLARK    2,236,260
ELECTRICAL CAPACITANCE DEVICE
Filed Feb. 15, 1935
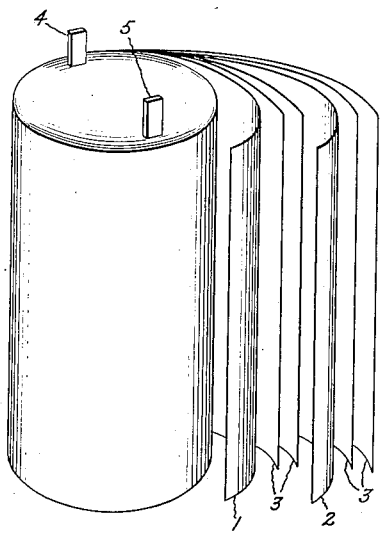
Inventor:
Frank M. Clark,
by Harry E. Dunham
His Attorney.

Patented Mar. 25, 1941

2,236,260

UNITED STATES PATENT OFFICE 2,236,260

ELECTRICAL CAPACITANCE DEVICE

Frank M. Clark, Pittsfield, Mass., assignor to General Electric Company, a corporation of New York Application February 15, 1935, Serial No. 6,625

7 Claims. (Cl. 175—41)

The present invention comprises improved electrical capacitors, cables, or other capacitance devices and its object is to give such devices a high electrical capacity.

I have discovered that superior electrical characteristics are obtained in capacitance devices when such devices are impregnated with a xylenol or a mixture comprising isomers of xylenol.

The accompanying drawing is a side elevation of a rolled type of electric capacitor (shown partly unrolled) suitable for impregnation in accordance with my invention.

This capacitor has a commonly used construction. Armatures or "plates" 1, 2 consisting of aluminum foil, or other suitable conducting material, and an interposed layer of porous sheet material such as one or more sheets of Kraft paper 3 are rolled up on one another and provided with electric contacts 4, 5. When thus assembled, such a unit is impregnated with xylenol, or a mixture containing xylenol.

The xylenols, as well known, contain two alkyl groups, and have the formula $C_6H_3OH(CH_3)_2$. The xylenols are available in several isomeric forms and when pure are solids of low melting point, ranging from 26 to 75° C. depending upon the type of isomer.

While it is possible to use the purified material consisting of a single isomer, the difficulty in the preparation of such material renders it less available than commercial mixtures. As a preferred embodiment of my invention, I use a fractionated distillate obtained by the distillation of coal tar.

A high-boiling coal tar distillation fraction showed a boiling range from 217 to 226° C., and had the following approximate analysis:

| | Per cent |
|---|---|
| Phenols | 0 |
| Ortho cresol | 0 |
| Metal cresol | Less than 1 |
| Para cresol | Less than 1 |
| Xylenols | 93–99 |

This fraction contained small amounts of other ingredients such as the methyl naphthalenes. Such a distillate consisting preponderantly of xylenol is suitable for capacitor and cable impregnation. By the term "xylenol" herein I mean to include compositions containing xylenol as a preponderant ingredient, not excluding small amounts of cresol as above indicated.

The capacity of a given capacitor unit, containing two sheets of .0005 inch Kraft paper, impregnated with the xylenol distillate fraction boiling between 217–226° C. before described, averaged about 2.5 microfarads. A similar capacitor impregnated with mineral oil had a capacity of about .50 to .75 microfarad. Paper treated with this xylenol fraction had an apparent dielectric constant of 12 to 14 as compared to the dielectric constant of 3.7 for oil-treated paper. Such capacitors containing xylenol are well adapted for use in low voltage direct current circuits and for alternating current circuits of moderately high voltage ordinarily below 220 volts. The power factor of such capacitor is about 5 to 6 per cent. Capacitors containing such a xylenol composition have on test withstood successfully without dielectric failure nearly a million intermittent applications of voltage.

Capacitors treated with xylenol have shown characteristics well adapted for operation on direct current circuits.

While I have described my invention with particular reference to xylenol, it is to be understood that my invention is not so limited. Other products of similar nature, pure or mixed, or the still higher boiling fractions obtained by the distillation of coal tar, are also to be included.

What I claim as new and desire to secure by Letters Patent of the United States, is:

1. A dielectric material for electric capacitors consisting preponderantly of xylenol.

2. A dielectric material for electric capacitors consisting substantially wholly of xylenol.

3. A capacitor comprising cooperating armatures and an interposed dielectric material consisting of porous paper which is impregnated with xylenol.

4. In an electric capacitor a liquid dielectric impregnant consisting preponderantly of xylenol.

5. In an electric capacitor having cooperating armatures, a porous sheet material therebetween, and an impregnant for said material consisting substantially exclusively of xylenol.

6. In an electric capacitor a layer of paper and a liquid dielectric impregnant consisting preponderantly of xylenol.

7. An electric capacitor comprising cooperating armatures, a layer of paper therebetween and a liquid impregnant for said paper consisting substantially exclusively of xylenol.

FRANK M. CLARK.